E. F. W. ALEXANDERSON.
REGULATING SYSTEM FOR ALTERNATING CURRENT CIRCUITS.
APPLICATION FILED OCT. 17, 1918.
1,337,875.
Patented Apr. 20, 1920.
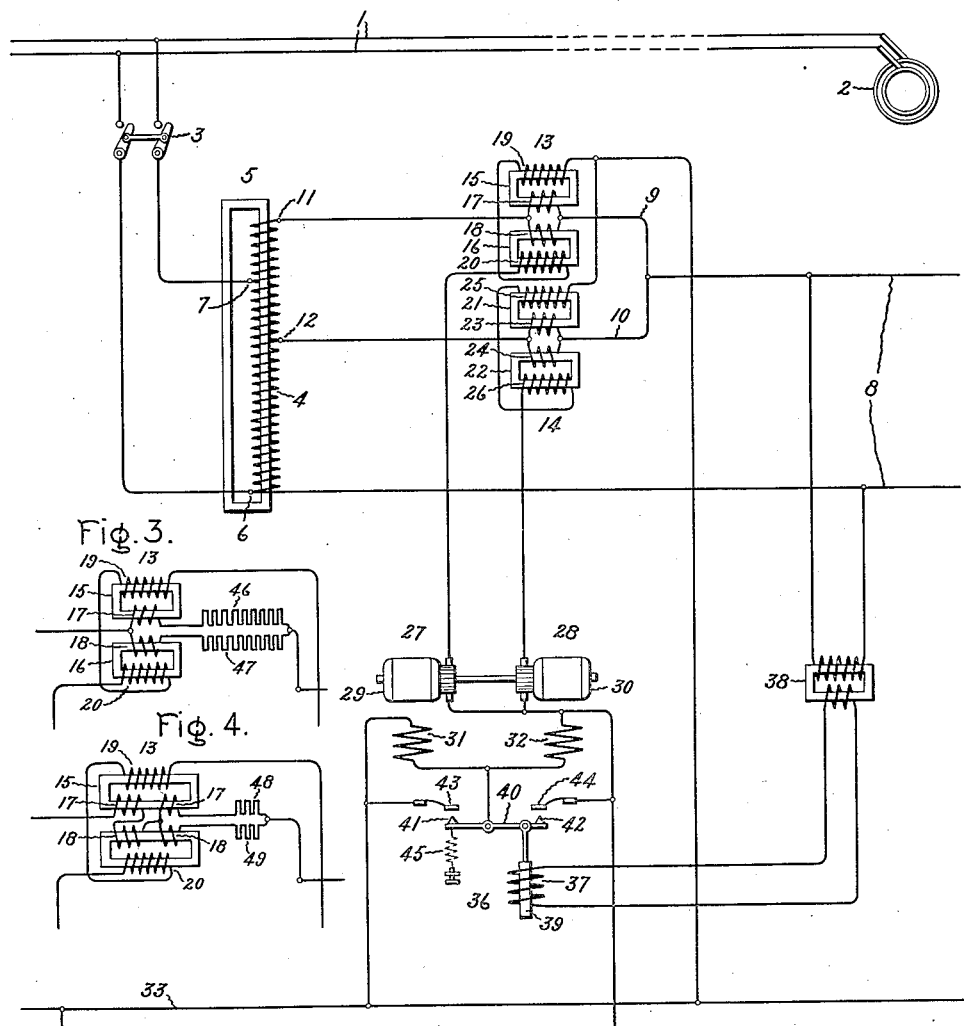
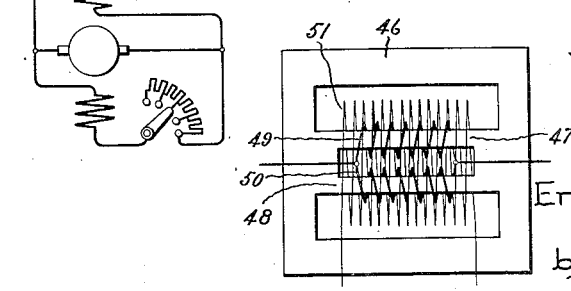
Inventor:
Ernst F. W. Alexanderson
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

REGULATING SYSTEM FOR ALTERNATING-CURRENT CIRCUITS.

1,337,875.

Specification of Letters Patent.

Patented Apr. 20, 1920.

Application filed October 17, 1918. Serial No. 258,620.

*To all whom it may concern:*

Be it known that I, ERNST F. W. ALEXANDERSON, a citizen of the United States, residing at Schenectady, in the county of Schenectady, State of New York, have invented certain new and useful Improvements in Regulating Systems for Alternating-Current Circuits, of which the following is a specification.

My invention relates to regulating systems for alternating current circuits and has for its object the provision of a new and improved system whereby regulation of an alternating current circuit may be accomplished without the interruption of power currents and without the use of heavy moving parts, and whereby quick and sensitive regulation may be obtained.

In accordance with my invention, I propose to regulate an electrical condition, such as the voltage of an alternating current circuit by means of a transformer which is connected so as to modify the voltage of said circuit and is provided with a winding to space apart points on which are connected reactors, the inductances of which are varied so as to regulate the effect of the transformer upon the alternating current circuit. In the modification of my invention which is illustrated in the accompanying drawings and is hereinafter particularly described, I connect the alternating current circuit, an electrical condition of which is to be regulated, to different potential points on the winding of a transformer by means of reactors and regulate the voltage of said circuit by varying the relative inductances of the reactors. The inductances of the reactors are preferably varied by producing in the cores thereof unidirectional fluxes hereinafter referred to as magnetizing fluxes. While it is preferable to regulate the inductances of the reactors by developing in the cores thereof a regulatable unidirectional flux, nevertheless the variation of the inductances of the reactors may in a measure be accomplished by developing in the cores thereof a regulatable alternating flux having a lower frequency than the frequency of the alternating current circuit to be regulated. Since unidirectional flux and unidirectional current may be properly considered as flux and current of zero frequency, the expression "flux having a lower frequency than the frequency of said circuit" as used herein is intended to include a unidirectional flux as well as an alternating flux, while the expression "current having a lower frequency than the frequency of said circuit" is intended to include unidirectional current as well as alternating current.

My invention may best be understood by reference to the following description considered in connection with the accompanying drawings, while the scope of my invention is defined in the appended claims.

Referring to the accompanying drawings, in Figure 1 of which is diagrammatically shown one modification of my invention as applied to the regulation of a single phase alternating current consumption circuit, in Fig. 2 of which is shown a modified form of reactor, and in Figs. 3 and 4 of which are shown modified arrangements of the reactor alternating current windings. 1 denotes an alternating current supply circuit, which is energized from a single phase source of current 2 and may be connected, by means of the switch 3, to the winding 4 of an auto-transformer 5 at the points 6 and 7. 8 denotes a consumption circuit, one side of which is connected to the winding 4 at the point 6 and the other side of which is connected, by means of the circuit portions 9 and 10, to the winding 4 at the points 11 and 12. 13 and 14 denote reactors, the former of which comprises magnetic cores 15 and 16 upon which are arranged windings 17 and 18, which are connected in parallel with one another and are interposed in the circuit portion 9, and magnetizing windings 19 and 20, and the latter of which comprises magnetic cores 21 and 22 upon which are arranged windings 23 and 24, which are connected in parallel with one another and are interposed in the circuit portion 10, and magnetizing windings 25 and 26. The windings 17 and 18 of the reactor 13 are so arranged with respect to the magnetizing windings 19 and 20 that, when the magnetomotive force of winding 19 assists the magnetomotive force of winding 17, the magnetomotive force of winding 20 opposes the magnetomotive force of winding 18, and vice versa. Similarly the windings 23 and 24 of the reactor 14 are so arranged with respect to the windings 25 and 26 that when the magnetomotive force of winding 25 assists the magnetomotive force of winding 23, the magnetomotive force of winding 26 opposes the magnetomotive force of winding 24, and vice versa. 27 and 28 denote counter electromotive force machines comprising armatures 29 and 30, which are preferably mounted on a common shaft, and field windings 31 and 32. The magnetizing windings 19 and 20 of the reactor 13 are connected in series with the armature 29 across buses 33 and 34, which may be supplied with direct current from a generator 35 or any other suitable source. Similarly the magnetizing windings 25 and 26 of the reactor 14 are connected in series with the armatures 30 across the buses 33 and 34. 36 denotes a vibratory device comprising a winding 37 connected, by means of a potential transformer 38, to the consumption circuit 8, a core 39 actuated by said winding 37, a movable arm 40 pivotally connected to said core, contacts 41 and 42 carried by said arm, and resiliently mounted stationary contacts 43 and 44 coöperating with the contacts 41 and 42. The windings 31 and 32 of the counter-electromotive force machines 27 and 28 are connected in series between the buses 33 and 34. The contacts 41 and 42 of the vibratory device 36 are connected by means of the movable arm 40 to a point intermediate the field windings 31 and 32. Contacts 43 and 44 of the vibratory device 36 are connected to the buses 33 and 34, respectively. An adjustable spring 45 may be employed in connection with the arm 40 to adjust the operation of the vibratory device 36. The vibratory device 36 will be adjusted, by means of the adjustable spring 45, so that, upon the voltage of the consumption circuit 8 increasing above a desired predetermined value, the core 39 will be raised thereby engaging contacts 42 and 44 and disengaging contacts 41 and 43, and, upon the voltage of the consumption circuit 8 decreasing below said desired predetermined value, the core 39 will be lowered thereby disengaging contacts 42 and 44 and engaging contacts 41 and 43.

If desired, reactors of the kind illustrated in Fig. 2 may be employed instead of the reactors 12 and 14 illustrated in Fig. 1. In Fig. 2, 46 denotes a magnetic core having legs 47 and 48 upon which are arranged windings 49 and 50, which are connected in parallel and correspond to windings 17 and 18, and windings 23 and 24, respectively, of reactors 13 and 14 shown in Fig. 1. 51 denotes a magnetizing winding surrounding both the windings 49 and 50. The windings 49 and 50 are oppositely wound with respect to the winding 51. With the arrangement of windings shown in Fig. 2 the inductive effect of the windings 49 and 50 upon the winding 51 is neutralized in each turn of the latter. Otherwise these reactors operate in the same manner as those shown in Fig. 1.

For purposes hereinafter explained the alternating current windings of the reactors may be connected in series with resistances 46 and 47, as illustrated in Fig. 3, or portions of the alternating current windings of the reactors may be connected in series with each other and with parallel circuits comprising other portions of the alternating current windings and resistances 48 and 49, as illustrated in Fig. 4.

The operation of my invention, as at present understood, is as follows:

Assume the circuit 1 to be energized, the switch 3 to be closed, and the direct current buses 33 and 34 to be energized from the generator 35. First, supposing the voltage of the consumption circuit 8 to be above the desired predetermined value, the core 39 will be in its upper position so that the contacts 42 and 44 will be engaged and the contacts 41 and 43 will be disengaged. The field winding 31 will then be energized and the field winding 32 will be deënergized since it will be short-circuited at the contacts 42 and 44. The counter electromotive force machine 27 will consequently operate as a motor and both armatures 29 and 30 will be rotated. In the armature 29 there will be developed a counter electromotive force which will limit the current in the magnetizing windings 19 and 20 of the reactor 13 to a relatively low value, while in the armature 30 there will be developed very little, if any, counter electromotive force so that the current in the magnetizing windings 25 and 26 of the reactor 14 will have a relatively high value. Under these conditions the voltage impressed upon the consumption circuit 8 will correspond substantially to the voltage between the points 6 and 12 of the transformer winding 1.

Now, supposing the voltage of the consumption circuit 8 to be below the desired predetermined value, the core 39 will be in its lower position so that the contacts 42 and 44 will be disengaged and the contacts 41 and 43 will be engaged. The field winding 31 will then be short-circuited at the contacts 41 and 43, and hence be deënergized, and the field winding 32 will be energized. The counter electromotive force machine 28 will consequently operate as a motor and both armatures 29 and 30 will be rotated. In the armature 30 there will be developed a counter electromotive force which will limit the current in the magnetizing windings 25 and 26 of the reactor 14 to a relatively low value, while in the armature 29 there will be developed very little, if any, counter electromotive force so that the current in the magnetizing windings 19 and 20 of the reactor 13 will have a relatively high value. Under these conditions, the voltage impressed upon the consumption circuit 8 will correspond substantially to the voltage between the points 6 and 11 of the transformer winding 4. Although the operation during only one vibration of the vibratory device 36 has been particularly described, it will be understood that the vibratory device 36 will normally be in rapid vibration and, by controlling the energization of the field windings 31 and 32 and thereby the counter electromotive forces interposed by the armatures 29 and 30 in the circuits of the magnetizing windings 19 and 20 of the reactor 13 and magnetizing windings 25 and 26 of the reactor 14, will regulate the relation of the inductances of the reactors 13 and 14 in such a manner as to maintain a substantially constant voltage on the consumption circuit 8.

The arrangement of the windings of the reactor not only prevents currents being induced in the magnetizing windings, but the second harmonic in the alternating current windings is suppressed and a linear proportionality between volts and amperes is more nearly attained because the reactors will have a practically constant reactance for each value of the magnetizing current. Since the alternating current windings of the reactors, shown in Figs. 1 and 2, act with respect to the direct current magnetizing windings as short-circuited secondaries, they have a dampening effect upon the flux changes. In order to increase the speed of the regulator it may therefore be desirable to reduce the short-circuited current by the use of resistances in series with the alternating current windings, the resistances being connected in the manner illustrated in Fig. 3. Since the alternating current supplied to the feeder circuit must traverse the resistances however there is some energy loss therein. The amount of this loss may be greatly reduced, if desired, by connecting only a portion of the alternating current circuits in parallel, thereby permitting a less amount of resistance to be used. This latter arrangement is illustrated in Fig. 4. By the use of counter electromotive machines, interposed between the vibratory device 36 and the magnetizing windings of the reactors 13 and 14, sensitive and quick regulation is secured without producing objectionable fluctuations in the voltage of the consumption circuit 8, due to the operation of the vibratory device 36. It is conceived, however, that other means than those shown may be employed, in combination with a vibratory device, to regulate the operation of the reactors 13 and 14 without the production of objectionable fluctuations in the voltage of the consumption circuit 8, due to the operation of the vibratory device.

Although my invention is illustrated as applied to a single phase alternating current circuit, it will be apparent to those skilled in the art how my invention may be applied to polyphase alternating current circuits.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:—

1. The combination with an alternating current circuit of means for regulating an electrical condition thereof comprising a transformer, a plurality of reactors having windings connected to spaced apart points on a winding of said transformer, means for developing in one of said reactors magnetic flux of lower frequency than the frequency of said circuit, and means for varying said flux.

2. The combination with an alternating current circuit of means for regulating an electrical condition thereof comprising a transformer, a plurality of reactors having windings connected to spaced apart points on a winding of said transformer, means for developing in one of said reactors a magnetic flux of lower frequency than the frequency of said circuit, and means responsive to an electrical condition of said circuit for varying said flux.

3. The combination with an alternating current supply circuit and an alternating current consumption circuit of means for regulating an electrical condition of said consumption circuit comprising a transformer interposed between said circuits, a plurality of reactors having windings connected to spaced apart points on a winding of said transformer, means for developing in said reactors a magnetic flux of lower frequency than the frequency of said supply circuit, and means responsive to an electrical condition of said consumption circuit for varying said flux.

4. The combination with an alternating current supply circuit and an alternating current consumption circuit of means for regulating an electrical condition of said consumption circuit comprising a transformer, a plurality of reactors having windings interposed between spaced apart points on a winding of said transformer and one of said circuits, means for developing in one of said reactors magnetic flux of lower frequency than the frequency of said supply circuit, and means for varying said flux.

5. The combination with an alternating current supply circuit and an alternating current consumption circuit of means for regulating an electrical condition of said consumption circuit comprising a transformer, a plurality of reactors having windings interposed between spaced apart points on a winding of said transformer and one of said circuits, means for developing in one of said reactors magnetic flux of lower frequency than the frequency of said supply circuit, and means responsive to an electrical condition of said consumption circuit for varying said flux.

6. The combination with an alternating current supply circuit and an alternating current consumption circuit of means for regulating an electrical condition of said consumption circuit comprising a transformer, a plurality of reactors having windings interposed between spaced apart points on a winding of said transformer and one of said circuits, means for developing in said reactors magnetic fluxes of lower frequency than the frequency of said supply circuit, and means responsive to an electrical condition of said consumption circuit for varying the relation of the fluxes in said reactors.

7. The combination with an alternating current supply circuit and an alternating current consumption circuit of means for regulating an electrical condition of said consumption circuit comprising a transformer, parallel circuit portions interposed between spaced apart points on a winding of said transformer and one of said circuits, a reactor for each of said circuit portions having a pair of windings connected in multiple therein, a core of magnetic material, and a magnetizing winding arranged simultaneously to assist the magnetomotive force of one winding of said pair and to oppose the magnetomotive force of the other winding of said pair, means for supplying currents of lower frequency than the frequency of said supply circuit to said magnetizing windings, and means for varying said currents.

8. The combination with an alternating current supply circuit and an alternating current consumption circuit of means for regulating an electrical condition of said consumption circuit comprising a transformer, parallel circuit portions interposed between spaced apart points on a winding of said transformer and one of said circuits, a reactor for each of said circuit portions having a pair of windings connected in multiple therein, resistances connected in series with said windings, a core of magnetic material, and a magnetizing winding arranged simultaneously to assist the magnetomotive force of one winding of said pair and to oppose the magnetomotive force of the other winding of said pair, means for supplying currents of lower frequency than the frequency of said supply circuit to said magnetizing windings, and means for varying said currents.

9. The combination with an alternating current supply circuit and an alternating current consumption circuit of means for regulating an electrical condition of said consumption circuit comprising a transformer, parallel circuit portions interposed between different potential points on a winding of said transformer and said consumption circuit, a reactor for each of said portions having a pair of windings connected in multiple therein, cores of magnetic material, and magnetizing windings arranged simultaneously to assist the magnetomotive force of one winding of said pair and to oppose the magnetomotive force of the other winding of said pair, means for supplying direct current to said magnetizing windings, and means responsive to an electrical condition of said consumption circuit for varying the relative values of the currents in the magnetizing windings of the different reactors.

10. The combination with an alternating current supply circuit and an alternating current consumption circuit of means for regulating an electrical condition of said consumption circuit comprising an autotransformer interposed between said circuits, parallel circuit portions interposed between different potential points of said transformer and said consumption circuit, a reactor for each of said circuit portions having a pair of windings connected in multiple therein, a core of magnetic material, and a magnetizing winding arranged simultaneously to assist the magnetomotive force of one winding of said pair and to oppose the magnetomotive force of the other winding of said pair, means for supplying direct current to said magnetizing windings, and means responsive to an electrical condition of said consumption circuit for varying the relative values of the currents in the magnetizing windings of the different reactors.

In witness whereof, I have hereunto set my hand this 15th day of October, 1918.

ERNST F. W. ALEXANDERSON.